United States Patent
Ruiz

[19]

[11] Patent Number: 6,058,926
[45] Date of Patent: May 9, 2000

[54] DROP-IN STEAMER

[75] Inventor: Guillermo A. Ruiz, Miami, Fla.

[73] Assignee: Stainless Incorporated, Deerfield, Fla.

[21] Appl. No.: 09/104,859

[22] Filed: Jun. 25, 1998

[51] Int. Cl.[7] .................................................. F24B 9/00
[52] U.S. Cl. ........................... 126/33; 126/377; 99/403;
99/483; 219/437; 219/433; 219/523; 392/447
[58] Field of Search .......................... 126/33, 377, 19 R,
126/20, 20.1, 369, 369.2, 350 B, 378; 99/331,
483, 446, 403; 392/324, 333, 447, 441–445;
219/437, 523, 433

[56] References Cited

U.S. PATENT DOCUMENTS

| | | |
|---|---|---|
| D. 349,421 | 8/1994 | Goad . |
| D. 358,292 | 5/1995 | Goad . |
| 527,252 | 10/1894 | Stroud ...................................... 126/369 |
| 1,095,534 | 5/1914 | Wahmann . |
| 1,217,880 | 2/1917 | Robbins . |
| 1,430,006 | 9/1922 | Demuth . |
| 1,521,867 | 1/1925 | Chalavouta . |
| 1,823,152 | 9/1931 | Larson ...................................... 126/33 |
| 1,939,715 | 12/1933 | Meitzler . |
| 2,024,259 | 12/1935 | Troeber et al. . |
| 2,679,841 | 6/1954 | Muckler . |
| 2,766,366 | 10/1956 | Eckhoff . |
| 2,867,712 | 1/1959 | Schwaneke . |
| 3,609,297 | 9/1971 | Christopoulos ........................ 126/369 |
| 3,949,733 | 4/1976 | Miller et al. . |
| 4,509,412 | 4/1985 | Whittenburg et al. . |
| 4,650,968 | 3/1987 | Williams .................................. 126/20 |
| 4,779,605 | 10/1988 | Smith et al. . |
| 4,897,525 | 1/1990 | Hirsch . |
| 5,119,800 | 6/1992 | Roberts et al. . |
| 5,189,947 | 3/1993 | Yim . |
| 5,203,257 | 4/1993 | Goad . |
| 5,235,903 | 8/1993 | Tippmann ................................ 126/20 |
| 5,269,217 | 12/1993 | Goad . |
| 5,381,729 | 1/1995 | Hennessy et al. . |

*Primary Examiner*—James C. Yeung
*Attorney, Agent, or Firm*—Price, Heneveld, Cooper, DeWitt & Litton

[57] ABSTRACT

A steamer is provided comprising a tank shell, one or more top doors acting as a cover to the steamer, a food holding grid inside the tank shell, and an elongated open-top water tray below the food holding grid to keep the steamer and food therein at a desired temperature.

24 Claims, 4 Drawing Sheets

DROP-IN STEAMER

BACKGROUND OF THE INVENTION

The present invention relates to food steamers, and more particularly to drop-in food steamers.

Steam tables like the ones in U.S. Pat. Nos. 1,521,867, 1,095,534, and U.S. Pat. No. 1,430,006 are used for heating food using steam and are known in the art. Steam tables such as the one shown in U.S. Pat. No. 1,521,867, however, are either large in size, or do not heat the food directly, or both. Furthermore, such structures do not employ a fully enclosed food holding chamber with a temperature control system to keep the food at a constant temperature.

Accordingly, there is a need for small, cost effective steamer to keep food warm and at the same time being able to be easily adapted to the existing restaurant layout.

SUMMARY OF THE INVENTION

The drop-in steamer of the present invention is a compact, inexpensive system for use primarily in fast food restaurants. The steamer provides an inexpensive and efficient way to keep food warm before it is served to a customer. The steamer of the present invention is also very versatile in that it may be dropped into an existing countertop or may stand alone.

One aspect of the present invention is a steamer comprising a tank shell having side walls, end walls, and a bottom with an elongated opening, at least one top door attached to the tank shell and acting as a cover to the steamer, an elongated open-top water tray below the elongated opening in the tank shell, a food holding grid attached to the tank shell, the food holding grid, the at least one top door, the side walls, and the end walls defining a food holding chamber, and a steam chamber below the food holding grid wherein steam from the open-top water tray can flow therethrough and upward into the food holding chamber.

Another aspect of the present invention is a food steamer comprising a tank shell having side walls, end walls, and a bottom with an elongated opening, at least one removable top door attached to the tank shell, the at least one removable top door in the tank shell defining an interior space, an open-top pan for holding water below the elongated opening, a food holding grid having spaces therein to allow heat, moisture, and food crumbs to enter and exit the food holding grid, a crumb collection pan above the open-top pan and below the food holding grid for catching food particles that fall through the spaces in the food holding grid, and a steam chamber in the interior space defined at its bottom by the tank shell and the open-top pan, and extending upwardly around the crumb collection pan to cause steam to flow through the interior space to cause the temperature in the interior space to increase to a desired level.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
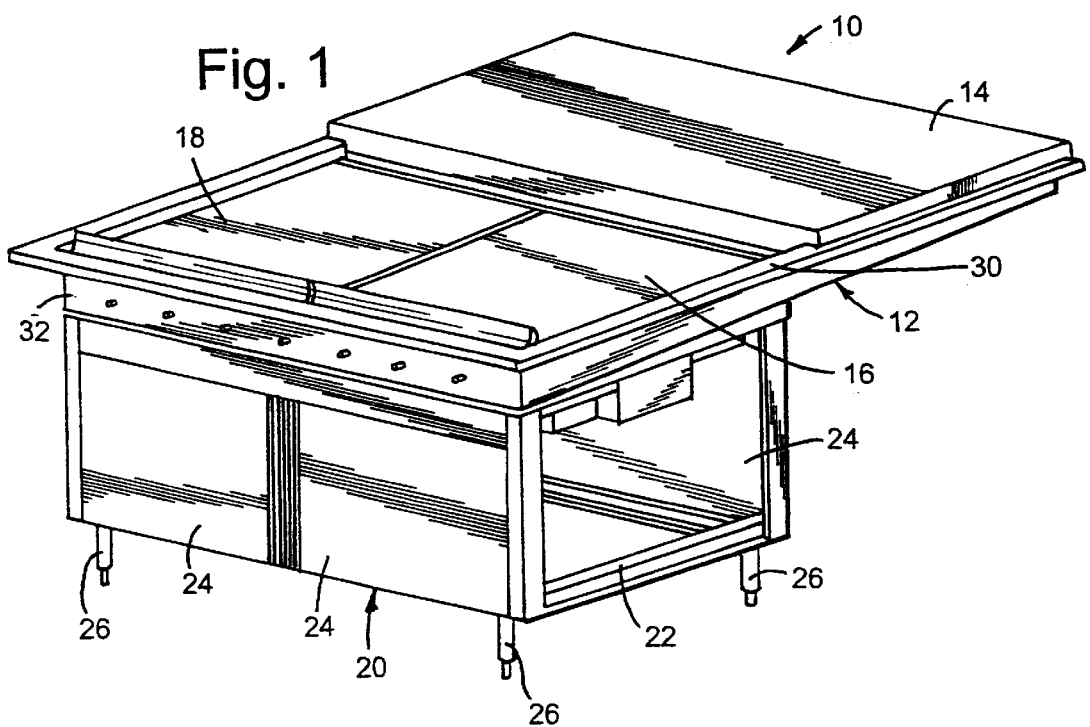
FIG. 1 is a perspective view of the steamer of the present invention.

For purposes of description herein, the terms "upper," "lower," "right," "left," "rear," "front," "vertical," "horizontal, " and derivatives thereof, shall relate to the invention as oriented in FIG. 1. However, it is to be understood that the invention may assume various alternative orientations, except where expressly specified to the contrary. It is also to be understood that the term "steam" as used herein includes steam as well as heated water vapor.

FIG. 1 shows the steamer 10 of the present invention which generally includes an outer tank shell 12, a removable cover 14, two removable top doors 16 and 18, and a frame 19. In FIG. 1, steamer 10 is shown attached to a base 20 which includes a frame 22, front and back panels 24, and legs 26. The use of base 20 with the present invention is optional. Steamer 10 may also be dropped into an existing countertop structure, such as those commonly found in fast food or family-type restaurants. Outer tank shell 12 includes two side walls 30 and 31, and two end walls 32 and 33.

Figure 2:
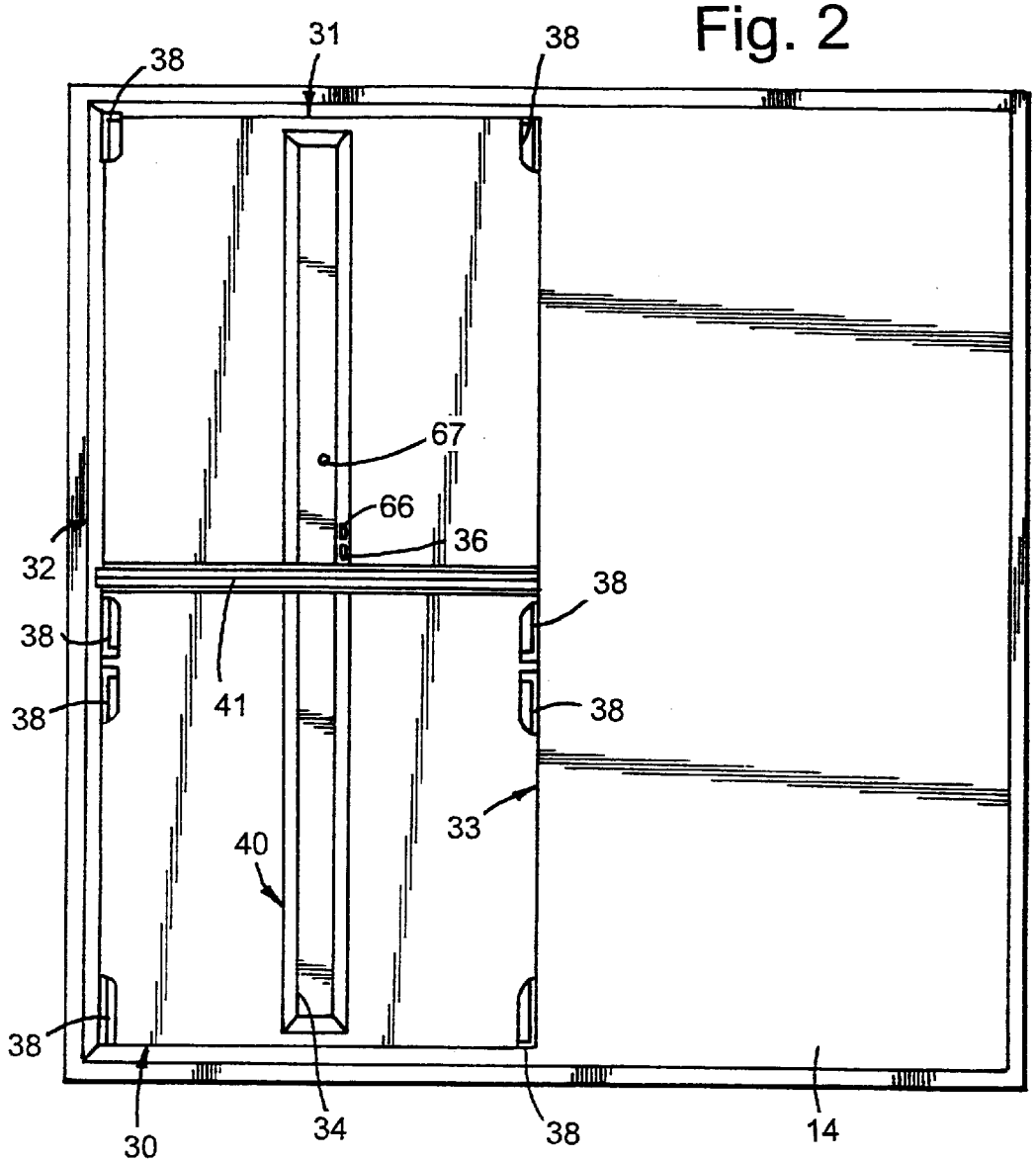
FIG. 2 is a top plan view of the steamer of FIG. 1 without top doors or food holding grids.

As shown in FIG. 2, attached to the tank walls are brackets 38 that are shaped and positioned so that two crumb collection pans and two food holding grids, discussed below, can be placed inside outer tank shell 12. Outer tank shell 12 includes an elongated opening 40 extending from one side wall 30 to the opposite side wall 31. An open-top water tray 34 resides directly beneath elongated opening 40. Open-top water tray extends nearly the entire width of steamer 10 from side wall 30 to side wall 31. Open-top water tray 34 has attached to it a fill pipe or tube 36, which allows water to at least partially fill the open-top water tray 34, as described in detail below. Open-top water tray 34 has a front-to-back dimension of approximately one-fifth the front-to-back dimension of the outer tank shell 12. This dimension of the open-top water tray may also be proportionately less, depending on the heater size and the amount of steam needed to fully warm food in steamer 10. Steamer 10 also includes a crossbar 41 which extends from end wall 32 to end wall 33. Crossbar 41 helps hold top doors 16 and 18 in place and facilitates the opening and closing of those doors.

Figure 3:
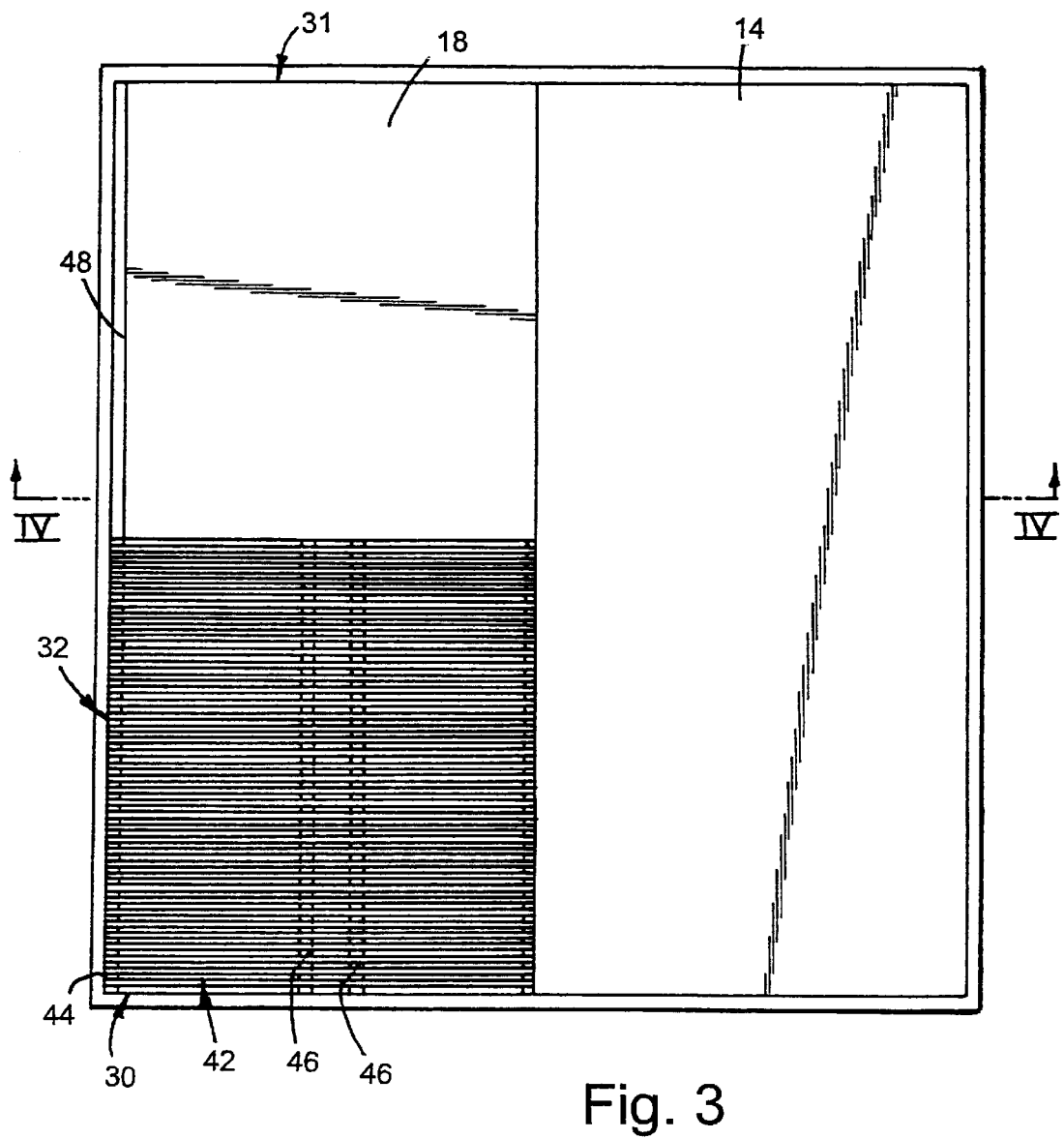
FIG. 3 is a top plan view of the steamer of FIG. 1 with one top door closed and one top door removed and including a food holding grid.

As seen in FIG. 3, a food holding grid 42 fits neatly and snugly in the outer tank shell 12 over brackets 38. Food holding grid 42 includes elongated rods 44, which are attached to cross-wise elongated supports 46. Elongated rods 44 are attached to elongated supports 46 in parallel to each other and with spaces therebetween to allow steam to come up through the spaces and to allow food particles to fall downwardly through the spaces. Top door 18 has a handle 48 which allows a user to slide door 18 rearwardly, along a track in crossbar 41 and along frame 19, to expose another food holding grid.

Figure 4:
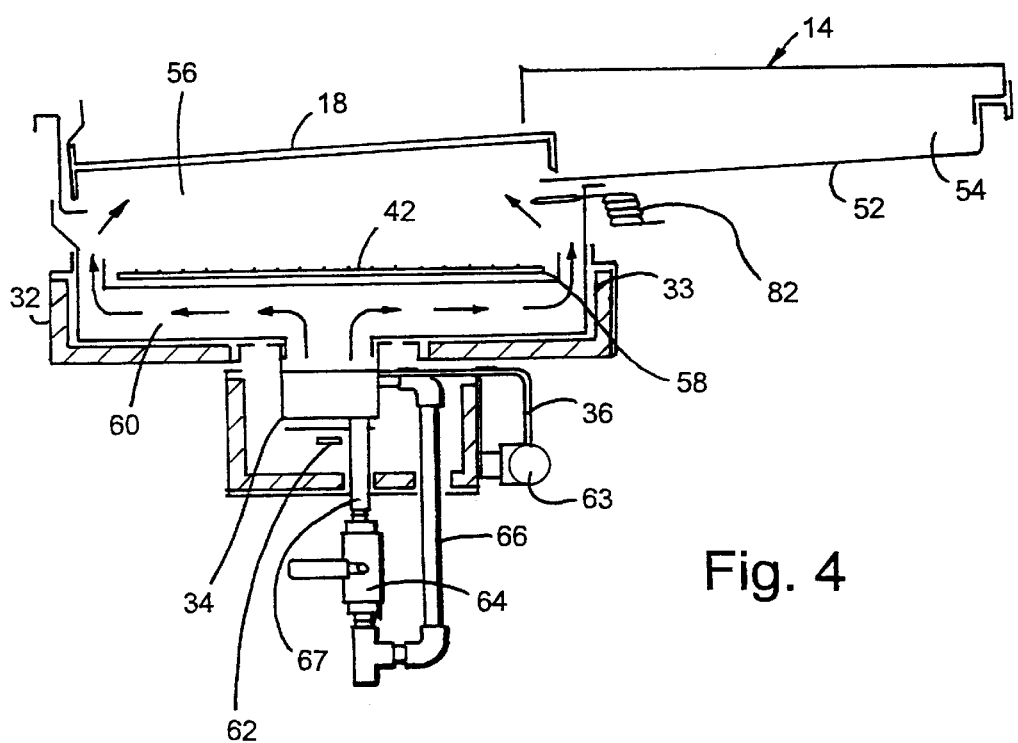
FIG. 4 is a cross-section view of the present invention taken along lines IV—IV in FIG. 3.

FIG. 4 shows in greater detail the operation of steamer 10 of the present invention. Removable cover 14 sits on a bottom piece 52, the two of which are connected together. Removable cover 14 and bottom piece 52 leave a space 54 therebetween which allows removable top doors 16 and 18 to slide therein. Removable top doors 16 and 18, along with outer tank shell 12, create an interior space 56 where food holding grid 42 is approximately centrally located. Directly below food holding grid 42 is a crumb collection pan 58, the purpose of which is to collect crumbs that fall off of the food through the spaces between the elongated rods 44 in food holding grid 42. The central location of food holding grid 42 and crumb collection pan 58 creates a steam chamber 60 below and around the sides of crumb collection pan 58 whereby steam can travel to fill interior space 56 once the steam is formed in open-top water tray 34. The travel of steam through the steam chamber 60 and interior space 56 is depicted by the arrows in FIG. 4. Steam is formed in open-top water tray 34 by heating water in the tray 34 to a temperature where it evaporates. This is accomplished by using a common heat source 62, such as an electrical heater. Water is supplied to the opentop water tray 34 through fill pipe or tube 36 (see FIG. 4) by using common plumbing and an electronic water level control including filling solenoid valve 63, shutoff drain valve 64 and an overflow drain pipe 66. Also included is a drain pipe 67 which allows quick drainage of open-top water tray 34 when the steamer is not in use or for cleaning.

Figure 5:
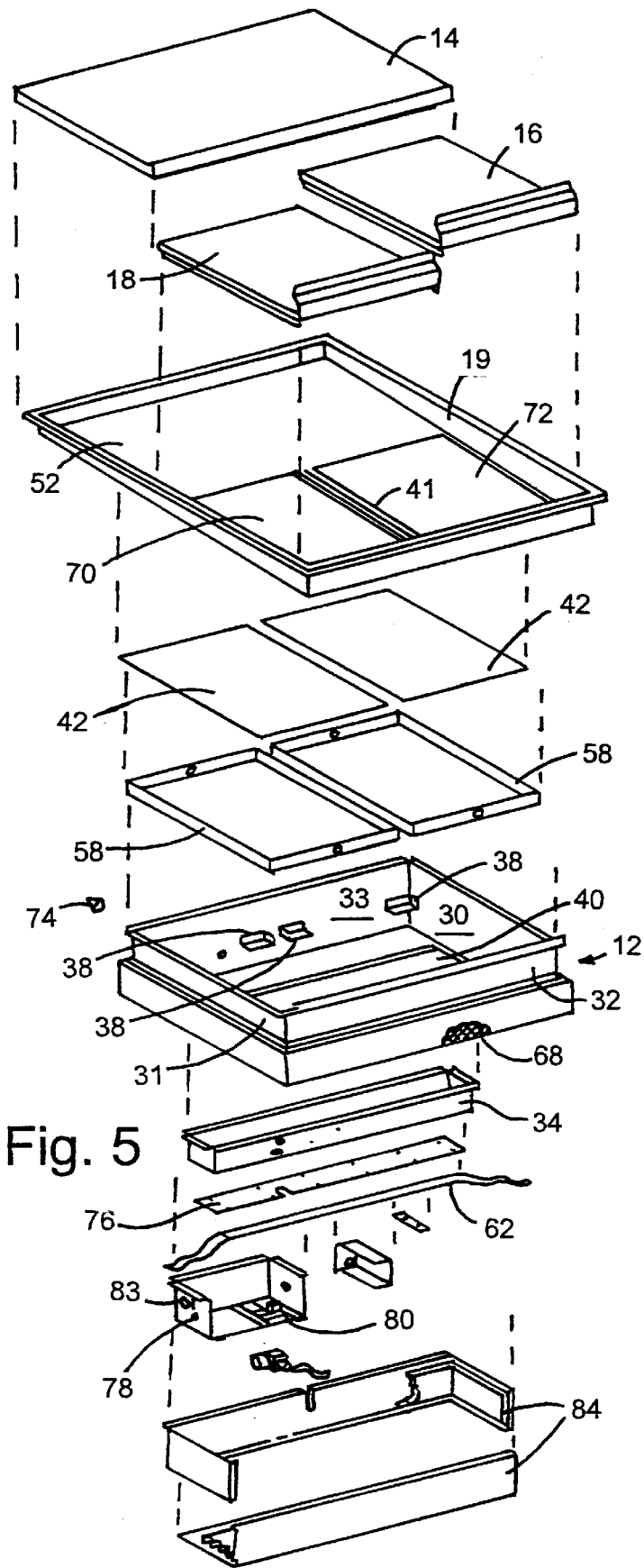
FIG. 5 is a perspective exploded view of the steamer of the present invention.

FIG. 5 shows the parts of the steamer of the present invention in detail. Starting with outer tank shell 12, which includes insulation 68, brackets 38 are positioned so that crumb collection pans 58 can easily be placed in and removed from outer tank shell 12. Food holding grids 42 fit inside crumb collection pans 58 and thus inside outer tank shell 12. Frame 19 fits over and around side walls 30 and 31 and end walls 32 and 33 of the outer tank shell 12. Shown with the frame are bottom piece 52 and crossbar 41. Bottom piece 52 and crossbar 41 define two openings 70 and 72 in frame 19. Removable top doors 16 and 18 fit over openings 70 and 72 and are slidably engaged with the bottom piece 52 of frame 19 and crossbar 41. Removable cover 14 fits over the back portion of frame 19, creating a space for removable top doors 16 and 18 to slide therethrough. Connected to the bottom of outer tank shell 12, directly beneath elongated opening 40, is open-top water tray 34. To ensure that the water stays at a constant level in open-top water tray 34, a water level sensor 74 is attached to end wall of water tray 34 and protrudes into open-top water tray 34. Directly beneath open-top tray 34 is an electric heater strip 62 with a heat deflector 76 to ensure consistent heating of the water in open-top water tray 34. Steamer 10 of the present invention also includes an access panel 78 with an on-off rocker switch (not shown) to allow easy controlling of the steamer. The access panel also includes a water level control 80 which is activated by the water level sensor 74. The system also includes a temperature sensor 82 (FIG. 4) in steam chamber 60. Temperature sensor 82 activates a temperature unit control 83 which resides on access panel 78 to keep the temperature consistent throughout the steam chamber 60 and the whole interior space 56 of steamer 10. An additional high temperature limit control which resides on access panel 84 is also provided to prevent overheating of the unit.

In operation, shutoff drain valve 64 is closed, which is indicated by the handle being in the horizontal position. An illuminated rocker switch is turned to the "on" position to start the unit. The filling solenoid valve 63 will click on and water will begin to fill up open-top water tray 34 through fill pipe 36. When the desired water level is reached, preferably 1½ inches, the water level sensor 74 activates a relay which will signal the filling solenoid 63, shutting it off. The heat source 62 is then activated, and in the illustrated embodiment, will heat the interior air to 155° F.±10° in 35 to 45 minutes. The thermostat 82 is preferably set to maintain a maximum temperature of 165° F.

The steamer of the present invention is a compact, inexpensive system to use primarily in fast food restaurants. The steamer provides a way to keep food warm before it is served and at the same time takes up little space. The steamer is also versatile in that it may be either dropped into an existing countertop structure, or stand alone as depicted in FIG. 1.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A steamer comprising:
   a tank shell having side walls, end walls, and a bottom with an elongated opening;
   at least two top doors attached to said tank shell and acting as a cover to the steamer;
   an elongated open-top water tray below said elongated opening in said tank shell;
   a heat source below said open-top water tray to produce steam;
   a food holding grid attached to said tank shell, said food holding grid, said at least two top doors, said side walls, and said end walls defining a food holding chamber; and
   a steam chamber below said food holding grid wherein steam from said open-top water tray can flow therethrough and upward into said food holding chamber.

2. The steamer defined in claim 1 wherein said removable doors are slidable and at an angle relative to the horizontal plane so that said removable doors will automatically close.

3. The steamer defined in claim 2 and further including a temperature sensor to retain the temperature in the steamer at a predetermined level.

4. The steamer defined in claim 3 wherein said open-top water tray extends from one side wall to the other side wall of said tank shell.

5. The steamer defined in claim 4 wherein the front-to-rear dimension of said open-top water tray is approximately one-fifth the front-to-rear dimension of said tank shell.

6. A food steamer comprising:
   a tank shell having side walls, end walls, and a bottom with an elongated opening;
   at least one removable top door attached to said tank shell, said at least one removable top door and said tank shell defining an interior space;
   an open-top pan for holding water below said elongated opening;
   a heat source under said open-top pan to produce steam;
   a food holding grid having spaces therein to allow heat, moisture, and food crumbs to enter and exit said food holding grid;
   a crumb collection pan above said open-top pan and below said food holding grid for catching food particles that fall through said spaces in said food holding grid; and
   a steam chamber in said interior space defined at its bottom by said tank shell and said open-top pan and extending upwardly around said crumb collection pan to cause steam to flow through said interior space to cause the temperature in said interior space to increase to a desired level.

7. The steamer defined in claim 6 wherein said at least one removable top door is slidable.

8. The steamer defined in claim 7 wherein said at least one removable top door is placed at an angle relative to the horizontal plane so that said removable top door will automatically close.

9. The steamer defined in claim 8 wherein said open top pan extends nearly the entire width of the steamer.

10. The steamer defined in claim 9 and further including a temperature sensor to keep the temperature in the steamer at a predetermined level.

11. The steamer defined in claim 6 wherein said at least one removable top door is placed at an angle relative to the horizontal plane so that said removable top door will automatically close.

12. The steamer defined in claim 6 wherein said open top pan extends nearly the entire length of the steamer.

13. The steamer defined in claim 6 and further including a temperature sensor to keep the temperature in the steamer at a predetermined level.

14. The steamer defined in claim 6 wherein the front-to-rear dimension of said open-top water tray is approximately one-fifth the front-to-rear dimension of said tank shell.

15. A steamer comprising:
- a tank shell having side walls, end walls, and a bottom with an elongated opening;
- at least one top door attached to said tank shell and acting as a cover to the steamer;
- an elongated open-top water tray below said elongated opening in said tank shell;
- a heat source below said open-top water tray to produce steam;
- a food holding grid attached to said tank shell, said food holding grid, said at least one top door, said side walls, and said end walls defining a food holding chamber;
- a steam chamber below said food holding grid wherein steam from said open-top water tray can flow therethrough and upward into said food holding chamber; and
- the steamer is of such a size and shape that it can be dropped into an existing countertop structure.

16. A steamer comprising:
- a tank shell having side walls, end walls, and a bottom with an elongated opening;
- two removable doors that are slidable and at an angle relative to the horizontal plane so that said removable doors will automatically close, said removable doors attached to said tank shell and acting as a cover to the steamer;
- an elongated open-top water tray below said elongated opening in said tank shell;
- a heat source below said open-top water tray to produce steam;
- a food holding grid attached to said tank shell, said food holding grid, said at least one top door, said side walls, and said end walls defining a food holding chamber; and
- a steam chamber below said food holding grid wherein steam from said open-top water tray can flow therethrough and upward into said food holding chamber.

17. The steamer defined in claim 16 and further including a temperature sensor to retain the temperature in the steamer at a predetermined level.

18. The steamer defined in claim 17 wherein said open-top water tray extends from one side wall to the other side wall of said tank shell.

19. The steamer defined in claim 18 wherein the front-to-rear dimension of said open-top water tray is approximately one-fifth the front-to-rear dimension of said tank shell.

20. A food steamer comprising:
- a tank shell having side walls, end walls, and a bottom with an elongated opening;
- at least one removable top door attached to said tank shell, said at least one removable top door and said tank shell defining an interior space, said at least one removable top door placed at an angle relative to the horizontal plane so that said at least one removable top door will automatically close;
- an open-top pan for holding water below said elongated opening;
- a heat source under said open-top pan to produce steam;
- a food holding grid having spaces therein to allow heat, moisture, and food crumbs to enter and exit said food holding grid;
- a crumb collection pan above said open-top pan and below said food holding grid for catching food particles that fall through said spaces and said food holding grid; and
- a steam chamber in said interior space defined at its bottom by said tank shell and said open-top pan and extending upwardly around said crumb collection pan to cause steam to flow through said interior space to cause the temperature in said interior space to increase to a desired level.

21. The steamer defined in claim 20 wherein said open-top pan extends nearly the entire width of the steamer.

22. The steamer defined in claim 21 and further including a temperature sensor to keep the temperature in the steamer at a predetermined level.

23. The steamer defined in claim 20 wherein said at least one removable top door is slidable.

24. A steamer comprising:
- a tank shell having side walls, end walls, and a bottom with an elongated opening;
- at least one top door that is slidable and at an angle relative to the horizontal plane so that said at least one top door will automatically close, said at least one top door attached to said tank shell and acting as a cover to the steamer;
- an elongated open-top water tray below said elongated opening in said tank shell;
- a heat source below said open-top water tray to produce steam;
- a food holding grid attached to said tank shell, said food holding grid, said at least one top door, said side walls, and said end walls defining a food holding chamber; and
- a steam chamber below said food holding grid wherein steam from said open-top water tray can flow therethrough and upward into said food holding chamber.

* * * * *